Figure 1:
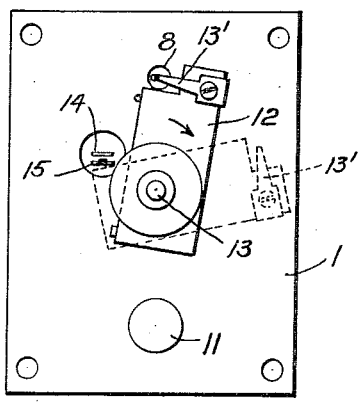

R. M. HOPKINS.
DETECTOR DEVICE.
APPLICATION FILED SEPT. 7, 1917.

1,309,286.

Patented July 8, 1919.

WITNESSES:

INVENTOR.
Richard M. Hopkins
BY
ATTORNEY

UNITED STATES PATENT OFFICE.

RICHARD M. HOPKINS, OF NEW YORK, N. Y., ASSIGNOR TO AMERICAN DISTRICT TELEGRAPH COMPANY, OF JERSEY CITY, NEW JERSEY, A CORPORATION OF NEW JERSEY.

DETECTOR DEVICE.

1,309,286.     Specification of Letters Patent.     Patented July 8, 1919.

Application filed September 7, 1917. Serial No. 190,104.

*To all whom it may concern:*

Be it known that I, RICHARD M. HOPKINS, a citizen of the United States of America, and resident of the borough of Manhattan, city, county, and State of New York, have invented certain new and useful Improvements in Detector Devices, of which the following is a specification.

My invention relates to improvements in detector devices, designed to indicate variations of current strength in a circuit, and particularly to what are known as "drop relays", such as are employed in burglar alarm systems, which are designed to indicate that there has been either an increase in, or decrease in, the current strength of the circuit. In such systems, it is common to employ detector instruments which will show either an increase or decrease in the current strength, in order that a person of ill intentions may not succeed in tampering with the circuit by cutting out the regular source of current supply and cutting in some other source of more or less approximately the same value. But heretofore it has been common to use for this purpose two relays, one arranged to indicate in the event of rise in current strength, the other to indicate in the event of fall in current strength. By my present invention I provide a single relay which performs the functions of the two relays heretofore employed. My invention, therefore, comprises a single relay or detector instrument which will operate to give a suitable indication in the event either of a rise or of a fall in current strength; and my invention further comprises various novel features of construction whereby this object is accomplished.

The object of my invention is to improve and simplify detector instruments of the type referred to, and to provide a single instrument of the general nature of a relay, whereby either rise of current above, or fall of current below, the normal value, will be indicated; also to make this apparatus very simple and compact.

Figure 2:
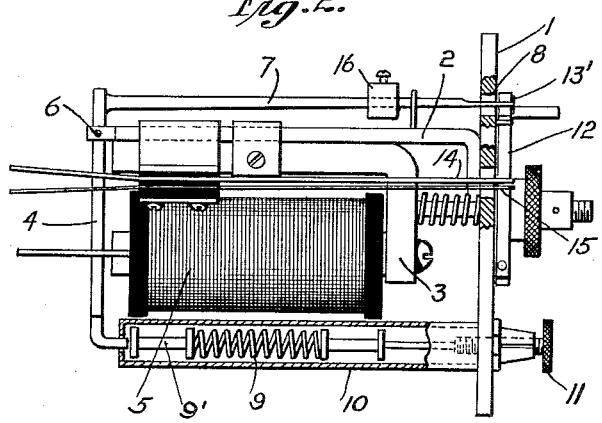
Figure 3:
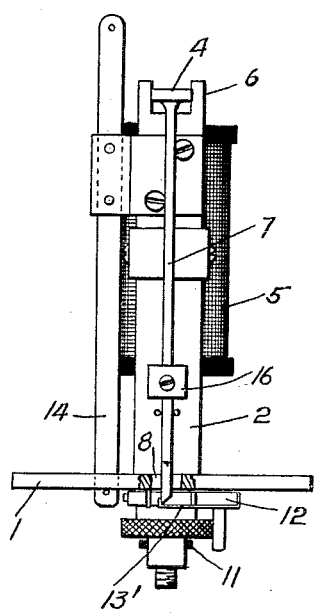

I will now proceed to describe my invention with reference to the acompanying drawings, and will then point out the novel features in claims. In the drawings:

Figure 1 shows a front view of the instrument; Fig. 2 shows a side view of the instrument, with portions shown in vertical section; Fig. 3 is a top view of the instrument; and Fig. 4 is a fragmentary perspective elevation and partial section of the drop shutter and associated parts of the instrument.

The relay shown in the above drawings is by its construction adapted to be set into a suitable recess in a switchboard panel; and comprises a front plate 1, upon which is mounted a support 2, for the yoke, 3, and armature, 4, of a relay of well known type; 5 designates the spool of this relay. The armature 4 is pivoted at 6, and carries a long light arm 7 extending to the front of the instrument, and through an aperture 8 of the front plate 1, for a purpose made apparent hereafter. The armature 4 also is arranged to react against a spring 9, mounted within a tube 10, and adjustable by means of a screw 11; this spring serving the purpose of the ordiary retractile spring of a relay, but being, in this case, a compression spring.

Figure 4:
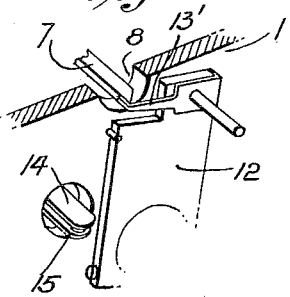

12 designates a shutter, pivoted at 13, and weighted so as to tend to swing in the direction of the arrow of Fig. 1; and 13' designates a light catch or hook carried by this member 12 and bent over to engage the extreme end of the forwardly projecting armature extension 7, as indicated more particularly in Fig. 4.

The operation of this instrument as a detector is as follows:

Normally the lever 7 occupies an intermediate position between that corresponding to the extreme attracted and the extreme retracted position of the armature, a position which it may occupy without extreme delicacy of adjustment, since in this intermediate position the spring 9 is not compressed by the armature, the pull of the magnet merely holding the armature against the stem $9^1$ of the spring. The hook $13^1$ is in engagement with this armature extension 7, and thereby the shutter 12 is held against falling. Now, should the attraction exerted by the magnet 5 rise materially, owing to increase in current strength, then the armature 4 will be moved toward the pole of the magnet against the pressure of the spring 9, and the end of the arm 7 will be raised so as to disengage that arm from the hook $13^1$, whereupon the shutter will drop to the position shown in dotted lines in Fig. 1.

The parts being in normal position, should the attraction of the magnet 5 decrease, owing to decreased current strength, then the weight 16 on arm 7, the action of which is balanced against that of the magnet, will move the armature 4, away from the pole of the magnet, and again member 7 will be freed from that hook and the shutter will drop to the position shown in dotted lines in Fig. 1.

It will be seen, therefore, that, owing to the normally balanced condition of the armature 4 between the attraction of the magnet and the retractive influence of the spring 9, the shutter 12 is normally held in raised position, but will fall in the event of either a material rise or material fall of strength of the current flowing through the coils of magnet 5. The relay is therefore adapted to serve the purpose of the two relays heretofore employed as previously described.

The fall of the shutter 12 will be in itself a visual indication of tampering with the strength of the current; but in addition contact springs 14 and 15, which will be brought together by the shutter 12 when the latter falls, may also be employed. In this way, when the shutter falls, the circuit is closed through springs 14 and 15, and thereby a bell may be sounded, or a detector lamp lighted, or some other suitable indication of the fall of the shutter given.

To facilitate the adjustment of the device, and to retract the armature upon fall in current strength, a weight 16 may be provided, which weight may be moved back and forth along the arm 7, and thus constitutes a simple means for the delicate adjustment of the action of the instrument.

While in the early portion of this specification I have indicated one use for a relay of the type herein illustrated and described, it will be understood that this relay is applicable to various other uses, and in referring to one use for it I do not intend to limit its field of use in any manner whatsoever.

What I claim is:

1. In an instrument such as described, the combination with a magnet, and an armature therefor, and retractile means for said armature arranged to oppose the normal attraction of the magnet on said armature, the said magnet and retractile means being balanced against one another normally with the armature in an intermediate position and free to move in either direction, of movable means tending normally to move from a normal position, and in engagement with said armature, and arranged by reason of such engagement to be held by said armature until movement thereof.

2. In an instrument such as described, the combination with a magnet, and an armature therefor, and retractile means for said armature arranged to oppose the normal attraction of the magnet on said armature, the said magnet and retractile means being balanced against one another normally with the armature in an intermediate position and free to move in either direction, of a pivoted shutter tending normally to move from a normal position, and in engagement with said armature, and arranged by reason of such engagement to be held by said armature until movement thereof.

3. In an instrument such as described, the combination with a magnet, and an armature therefor, having an extension, and retractile means for said armature arranged to oppose the normal attraction of the magnet on said armature, the said magnet and retractile means being balanced against one another normally with the armature in an intermediate position and free to move in either direction, of movable means tending normally to move from a normal position, and in engagement with such armature extension, and arranged by reason of such engagement to be held by said armature until movement thereof.

4. In an instrument such as described, the combination with a magnet, and an armature therefor, having an extension, and retractile means for said armature arranged to oppose the normal attraction of the magnet on said armature, the said magnet and retractile means being balanced against one another normally with the armature in an intermediate position and free to move in either direction, of a pivoted shutter tending normally to move from a normal position, and in engagement with such armature extension and arranged by reason of such engagement to be held by said armature until movement thereof.

5. In an instrument such as described, the combination of a supporting frame including a frame plate, a frame member extending rearwardly therefrom, a magnet carried by said frame member, an armature for said magnet pivoted to said frame member and having an extension projecting forwardly through an aperture in said frame plate, and a shutter pivoted to the front of the frame plate, and provided with a hook normally engaging such armature extension, and retractile means acting upon said armature in opposition to the magnet, the said magnet and retractile means being balanced against one another normally with the armature in an intermediate position and free to move in either direction.

6. In an instrument such as described, the combination of a supporting frame including a frame plate, a frame member extending rearwardly therefrom, a magnet carried by said frame member, an armature for said magnet pivoted to said frame member and having an extension projecting forwardly through an aperture in said frame plate, and a shutter pivoted to the front of the frame plate, and provided with a hook normally engaging such armature extension, and a retractile spring acting upon said armature in opposition to the magnet, the said magnet and spring being balanced against one another normally with the armature in an intermediate position and free to move in either direction.

7. In an instrument such as described, the combination of a supporting frame including a frame plate, a frame member extending rearwardly therefrom, a magnet carried by said frame member, an armature for said magnet pivoted to said frame member and having an extension projecting forwardly through an aperture in said frame plate and a shutter pivoted to the front of the frame plate, and provided with a hook normally engaging such armature extension, and a compression spring acting upon said armature in opposition to the magnet, the said magnet and spring being balanced against one another normally with the armature in an intermediate position and free to move in either direction.

8. In an instrument such as described, the combination of a supporting frame including a frame plate, a frame member extending rearwardly therefrom, a magnet carried by said frame member, an armature for said magnet pivoted to said frame member and having an extension projecting forwardly through an aperture in said frame plate, and a shutter pivoted to the front of the frame plate, and provided with a hook normally engaging such armature extension, and retractile means acting upon said armature in opposition to the magnet, said armature extension provided with a suitable weight whereby the action of the instrument may be adjusted.

9. A detecting instrument such as described, comprising a single magnet, a single armature therefor, retractile means for said armature, and means normally holding said armature in a position intermediate its limiting attracted and retracted positions, such means likewise held against motion by the armature itself, and arranged upon either attractive or retractive motion of the armature, to move to another position.

10. In a detecting instrument such as described, the combination with a magnet and an armature therefor, a compression retractile spring for said armature arranged to be engaged by the armature when the latter is in a position intermediate its extreme positions, and other retractile means for said armature acting thereon before the armature engages said retractile spring, of movable means tending normally to move from a normal position, and in engagement with said armature, and arranged by reason of such engagement to be held by said armature until movement thereof.

11. In an instrument such as described, the combination with a magnet, and an armature therefor, and two retractile means for such armature arranged to oppose the normal attraction of the magnet on said armature, one of said retractile means operating constantly on said armature, the other arranged to act thereon only when the armature occupies a predetermined position intermediate its extreme positions, of movable means tending normally to move from a normal position, and in engagement with said armature and arranged by reason of such engagement to be held by said armature until movement thereof.

12. A detecting instrument such as described, comprising a single magnet, a single armature therefor, retractile means for said armature, causing the latter to occupy normally an intermediate position, with the armature attracted by the magnet to a normal extent, and means normally engaging said armature and held thereby but tending to move to another position, and arranged to so move when the armature moves from its normal position.

In testimony whereof I have signed this specification in the presence of two subscribing witnesses.

RICHARD M. HOPKINS.

Witnesses:
ABIGAIL F. McCLEAN,
GEO. BOSCH.